April 30, 1940. C. J. PHILLIPS 2,198,739
TEMPERING GLASS
Filed Dec. 28, 1936
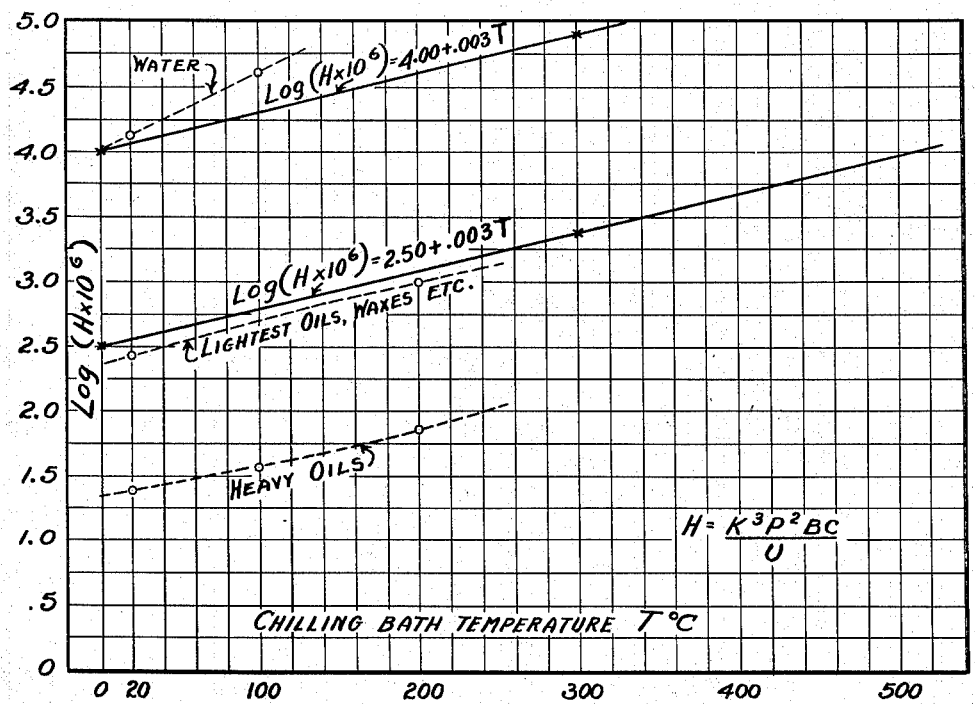
INVENTOR.
CHARLES JOHN PHILLIPS
BY Dorsey & Cole
ATTORNEYS.

Patented Apr. 30, 1940

2,198,739

UNITED STATES PATENT OFFICE 2,198,739

TEMPERING GLASS

Charles John Phillips, Corning, N. Y., assignor to Corning Glass Works, Corning, N. Y., a corporation of New York Application December 28, 1936, Serial No. 117,985

8 Claims. (Cl. 49—89)

This invention relates to tempering glass and more particularly to liquid baths for chilling heated glass bodies in the production of tempered glass articles.

Liquid baths such as oils, fats, and waxes have long been used as chilling media in glass tempering processes but due to the fact that these substances impart only a fraction of the temper to a glass which it can successfully withstand the generally accepted liquid media heretofore used for glass tempering purposes have but a limited field of useful application.

I have discovered that in articles made from low expansion glasses or glasses which possess a short working range it is impossible to develop the highest tempered strengths which the glass can stand by chilling in liquids such as those heretofore used by the prior art.

There is a difference in the inherent chilling severity of different liquids even among those of apparently similar nature. My experiments have shown me that each liquid produces a different degree of temper in glass bodies of identical size, shape, and glass composition even though the temperature of the chilling baths are kept uniform and the temperature to which the glass bodies are heated prior to chilling is the same for all of the articles.

This is due to the fact that the ability of any substance to absorb heat at a given temperature depends on the physical characteristics of the substance at that temperature, and no two substances have identical characteristics of thermal conductivity, specific gravity, viscosity, etc., at the same temperature.

Of the chilling media disclosed by the prior art water is not satisfactory for the reason that its chilling action is so severe that even articles made from very low expansion glasses are either completely broken or their surfaces are badly checked when they are chilled therein. On the other hand, the action of other chilling media commonly employed, such as gases, oils, fats, waxes, resins, molten salts and molten metals, is such that the degree of chill imparted to the ware is not as high as that which the glass is capable of withstanding and, consequently, no ware has heretofore been produced commercially from these glasses in which the highest possible tempered strengths have been developed.

The primary object of the present invention is to introduce into a tempered glass article a degree of strain higher than that heretofore possible to attain without disrupting the article or its surface.

A further object is to produce predetermined degrees of temper in an article intermediate its annealed strength and up to its maximum tempered strength.

The above and other objects may be attained by practicing my invention which embodies among its features heating an article to a temperature lying between its annealing and softening temperatures and immersing it in a liquid chilling bath having a chilling power which while it is less than that of water is materially greater than that of the tempering media employed by the prior art.

More specifically my invention embodies a chilling medium for use in tempering glass which consists of a liquid chilling bath having a chilling power lying between the values log $$(H \times 10^6) = 4.00 + 0.003T$$

and log $$(H \times 10^6) = 2.50 + 0.003T$$

in which T is the temperature of the chilling bath in degrees centigrade.

In the drawing is graphically depicted curves showing the field within which the chilling power of the bath must be to produce the additional degree of temper which has been found desirable.

When a heated glass body is immersed in a liquid bath having a temperature lower than that of the glass, heat will flow from the glass into the bath and the more rapid this transfer of heat the greater will be the chilling action of the bath on the glass. For the sake of convenience I refer to the ability of the liquid bath to absorb heat as the chilling power H of the bath.

Investigations have shown that the chilling power H for liquids for use in tempering glass is dependent on the various physical properties of the liquid bath, i. e., thermal conductivity of the liquid, specific gravity of the liquid, temperature coefficient of expansion of the liquid, specific heat at constant pressure of the liquid and the absolute viscosity of the liquid. These physical properties are subject to change in magnitude as the temperature of the bath changes and as a consequence the chilling power H will also change with a variation of the bath temperature.

In order to produce the highest tempered strength in a glass article it is necessary to chill it in a tempering medium which will remove heat from the glass at the maximum rate which the particular glass will stand without surface checking or fracture. The chilling power H for liquid tempering media is obtainable from the following formula:

$$(1) \quad H = \frac{K^3 P^2 BC}{U}$$

where

K equals the thermal conductivity of the liquid in B. t. u. per hour per square foot per degree F. per foot.

P equals the specific gravity in pounds per cubic foot.

B equals the temperature coefficient of expansion per degree F.

C equals the specific heat at constant pressure B. t. u. per pound per degree F.

U equals the absolute viscosity in pounds per hour per foot.

Since the above physical properties all change in magnitude as the temperature of the bath changes, it follows that the chilling power H will also change with the bath temperature and hence it is necessary in using the formula specifying the chilling power H to specify the temperature at which the bath is to be maintained when in use. At such a fixed temperature, H for any bath will appear as a dimensionless number which, upon comparison with other values of H for other baths and temperatures, will give a numerical indication of the chilling power of the particular bath at the particular temperature.

Other important factors which determine the degree of temper obtainable in a glass body by chilling it into a liquid bath are:

(1) The temperature to which the body is heated when it enters the bath;
(2) The temperature of the chilling bath;
(3) The thermal coefficient of linear expansion of the glass;
(4) The modulus of elasticity of the glass;
(5) The thickness of the glass;
(6) The viscosity vs. temperature relationship of the glass;
(7) The thermal diffusivity of the glass.

The degree of temper which can be imparted to a glass body in tempering is dependent upon the rate at which heat is removed from the surface of the body by the chilling medium. The rate at which heat is removed from the body is determined by the value of the chilling power H of the chilling medium and the difference in temperature of the glass and the bath. From this it follows that the greater the chilling power H possessed by the chilling medium the greater will be the chilling action of the liquid bath upon the glass body for a given temperature difference between the bath and the glass body when immersed therein and hence also the greater will be the degree of final temper imparted to the glass body.

Due largely to the increasing fluidity of the bath, the chilling power H of a liquid chilling bath increases as the bath temperature increases. This compensates in part for the loss of temperature gradient between the glass and the bath for as the glass cools the bath becomes more highly heated and consequently more fluid with the result that it is in one respect capable of extracting heat from the glass more rapidly than when in its cooler state.

In actual practice I have employed glasses having different compositions and physical characteristics as shown in Tables I and II below.

Table I

|  | A | B |
|---|---|---|
| $SiO_2$ | 80.9 | 60.6 |
| $B_2O_3$ | 12.9 | 28.8 |
| $Na_2O$ | 4.4 | 8.1 |
| $Al_2O_3$ | 1.8 | 2.5 |

Table II

|  | Softening temp. | Annealing temp. | Strain temp. | Expansion per degree C. |
|---|---|---|---|---|
|  | °C. | °C. | °C. |  |
| A | 819 | 553 | 510 | $32 \times 10^{-7}$ |
| B | 703 | 496 | 461 | $46 \times 10^{-7}$ |

I have discovered a number of liquid media having a chilling power H which lies between the values log $(H \times 10^6) = 4.00 + 0.003T$ and log $(H \times 10^6) = 2.50 + 0.003T$ among which are 1:2:4 trichlorbenzine having a chilling power H of log $(H \times 10^6) = 3.25 + 0.00475T$, light chlorinated resin which has a chilling power H of log $(H \times 10^6) = 2.55 + 0.0035T$, diphenyl oxide which has a chilling power H of log $$(H \times 10^6) = 3.12 + 0.00475T$$

and certain combinations and mixtures of the above, the chilling powers H of which can be made to vary between the values log $$(H \times 10^6) = 4.00 + 0.003T$$

and log $$(H \times 10^6) = 2.50 + 0.003T$$

As one example of the use of one of these media with low expansion borosilicate glass having the composition and physical characteristics corresponding to glass A disclosed in Tables I and II above a slab measuring 2" x 4" x ¼" was subjected for a period of six minutes to a temperature of 760° C. and then immediately plunged into a chilling bath of 1:2:4 trichlorbenzine held at a temperature of 20° C. This resulted in the introduction into the piece of a maximum tension of four kilograms per square millimeter. A like piece of glass subjected in the same manner for a like period of time to a like temperature and then introduced into a chilling bath consisting of light chlorinated resin at a temperature of 50° C. was found to possess a maximum tension of 3.60 kilograms per square millimeter. In a third instance a 2" x 4" x ¼" slab of borosilicate glass having the same composition and physical characteristics as glass A above was subjected for a period of six minutes to a temperature of 760° C. and then plunged into a liquid chilling bath composed of diphenyl oxide held at a temperature of 20° C. and upon examination was found to possess a maximum tension of 3.90 kilograms per square millimeter.

Similar experiments were carried on using glass B disclosed in Tables I and II above. Slabs of this glass 2" x 4" x ¼" were subjected to a temperature of 675° C. for a period of six minutes and then immediately introduced into a liquid chilling bath consisting of 1:2:4 trichlorbenzine held at a temperature of 20° C. and were found to possess a maximum tension of 5.75 kilograms per square millimeter. Similar pieces heated as above and then chilled into a liquid chilling bath consisting of light chlorinated resin held at a temperature of 50° C. were found to possess a maximum tension of 4.70 kilograms per square millimeter. When like slabs heated in a like manner were chilled in a liquid chilling bath consisting of diphenyl oxide held at a temperature of 20° C. they were found to possess a maximum tension of 5.35 kilograms per square millimeter.

The chilling media mentioned above are but a few of those which I know to possess chilling powers H suitable for my purpose and have been disclosed merely as examples of liquid chilling media having chilling powers H lying between log $$(H \times 10^6) = 4.00 + 0.003T$$

and log $$(H \times 10^6) = 2.50 + 0.003T$$

Hence I do not in any way wish to be limited to the specific examples given above. Moreover different methods of heat conditioning glass articles prior to chilling them may be resorted to without departing from the spirit and scope of my invention.

This application is a continuation-in-part of a copending application filed by me on the 16th day of September, 1935, Serial Number 40,842.

What I claim is:

1. The method of tempering glassware which includes heating it to a temperature lying between its strain and softening temperatures and chilling it in a liquid bath having a chilling power lying between the values log $$(H \times 10^6) = 4.00 + 0.003T$$

and log $$(H \times 10^6) = 2.50 + 0.003T$$

where T is the temperature of the chilling bath in degrees centigrade.

2. The method of tempering low expansion glassware which includes heating it to a temperature lying between its annealing and softening temperatures and chilling it in a liquid bath having a chilling power lying between the values log $$(H \times 10^6) = 4.00 + 0.003T$$

and log $$(H \times 10^6) = 2.50 + 0.003T$$

where T is the temperature of the chilling bath in degrees centigrade.

3. The method of tempering glassware which includes heating it to a temperature lying between its strain and softening temperatures and chilling it in a liquid bath having a chilling power of the value log $(H \times 10^6) = 3.25 + 0.00475T$, where T is the temperature of the chilling bath in degrees centigrade.

4. The method of tempering glass which includes heating it to a temperature lying between its strain and softening temperatures and chilling it in a liquid bath having a chilling power of the value log $(H \times 10^6) = 2.55 + 0.0035T$, where T is the temperature of the chilling bath in degrees centigrade.

5. The method of tempering glass which includes heating it to a temperature lying between its strain and softening temperatures and chilling it in a liquid bath having a chilling power of the value log $(H \times 10^6) = 3.12 + 0.00475T$, where T is the temperature of the chilling bath in degrees centigrade.

6. The method of tempering glassware which comprises heating it to a temperature between its strain and softening temperatures and chilling it in a bath having a temperature lower than the strain temperature of the glass, said bath comprising 1:2:4 trichlorbenzine.

7. The method of tempering glassware which comprises heating it to a temperature between its strain and softening temperatures and chilling it in a bath having a temperature lower than the strain temperature of the glass, said bath comprising light chlorinated resin.

8. The method of tempering glassware which comprises heating it to a temperature between its strain and softening temperatures and chilling it in a bath having a temperature lower than the strain temperature of the glass, said bath comprising diphenyl oxide.

CHARLES JOHN PHILLIPS.